N. P. KEMP.
CAR DOOR FASTENING.
APPLICATION FILED AUG. 31, 1914.
1,152,419.
Patented Sept. 7, 1915.
2 SHEETS—SHEET 1.
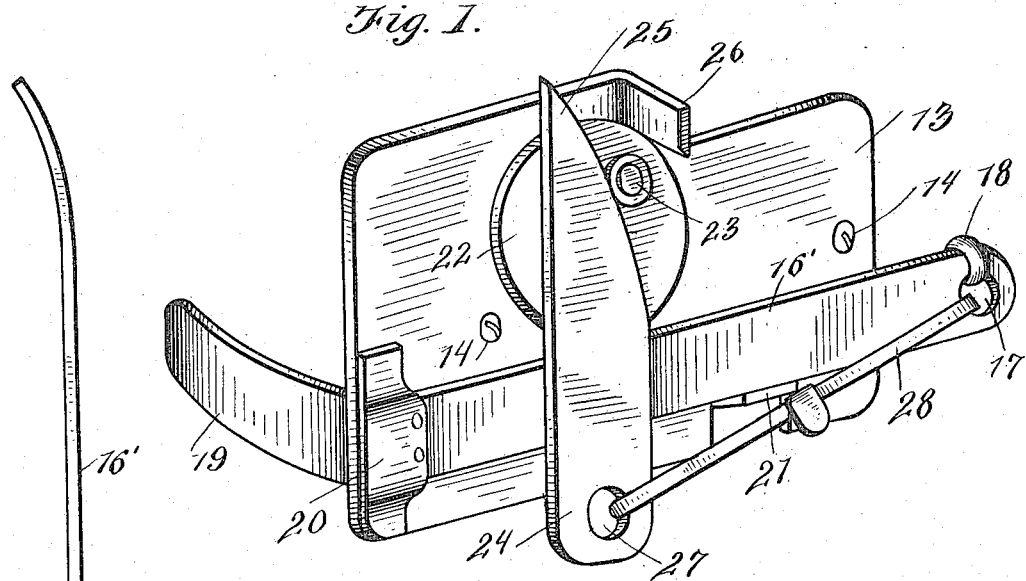
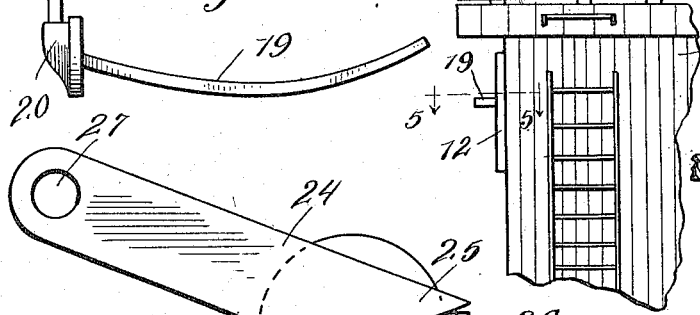
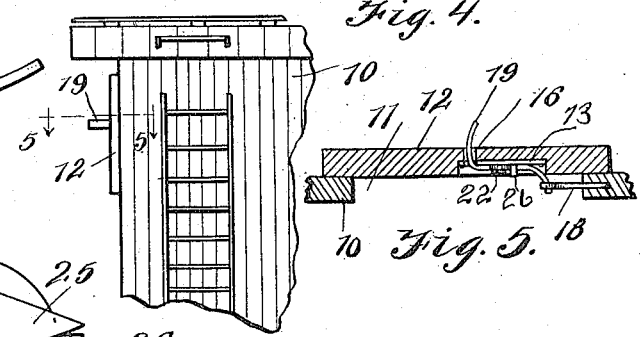
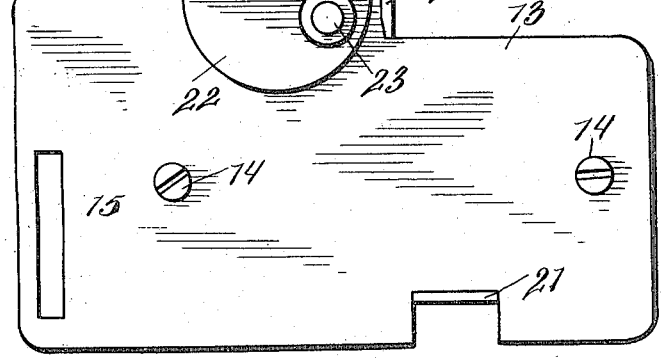
Witnesses
Wynne Johnson
Inventor
N. P. Kemp.
By
C. L. Parker
Attorneys

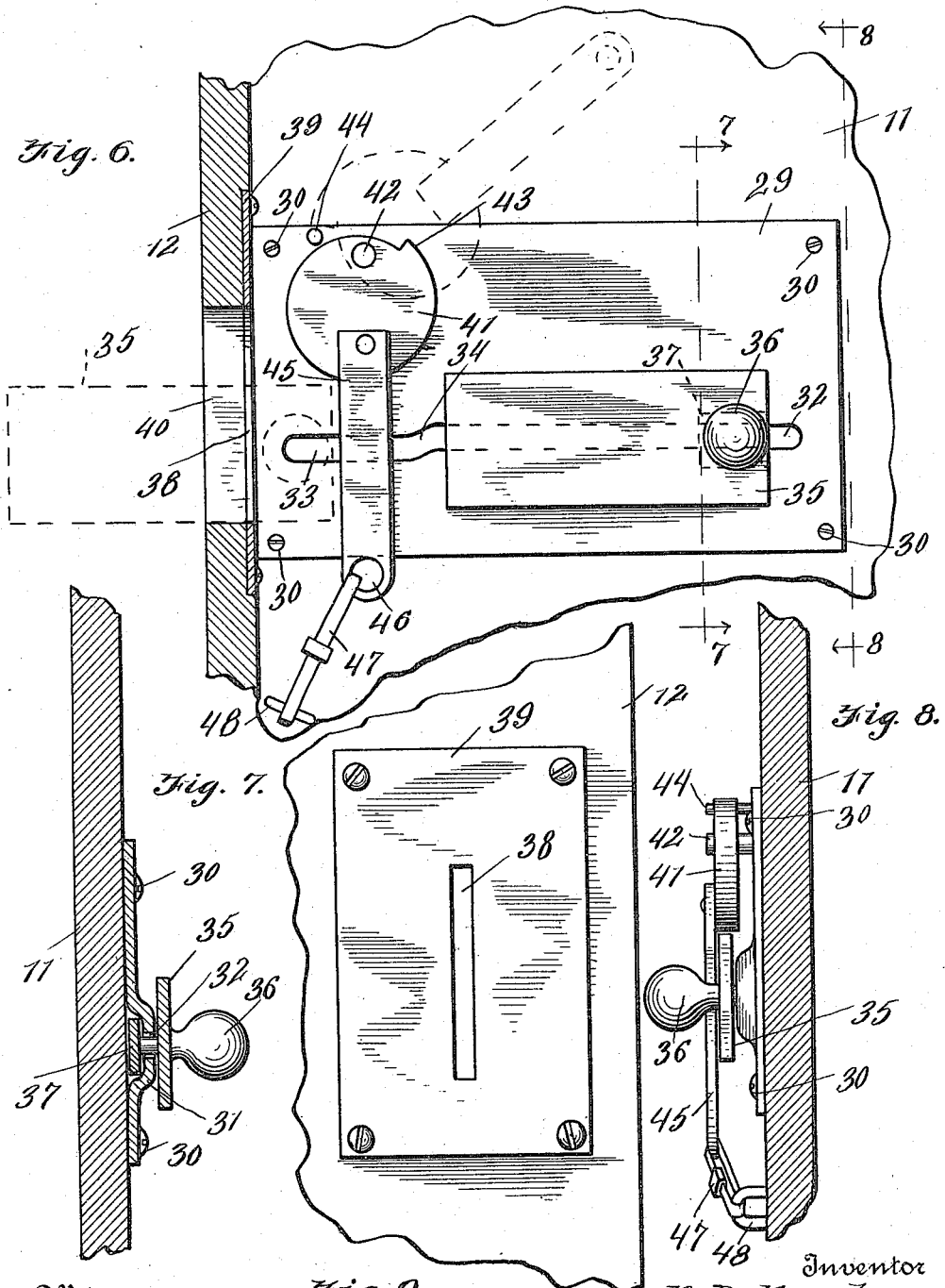

UNITED STATES PATENT OFFICE.

NOAH P. KEMP, OF NORFOLK, VIRGINIA.

CAR-DOOR FASTENING.

1,152,419.  Specification of Letters Patent.  Patented Sept. 7, 1915.

Application filed August 31, 1914. Serial No. 859,374.

*To all whom it may concern:*

Be it known that I, NOAH P. KEMP, a citizen of the United States, residing at Norfolk, in the county of Norfolk and State of Virginia, have invented certain new and useful Improvements in Car-Door Fastenings, of which the following is a specification.

My invention relates to locks or fastenings for the doors or end-doors of a box or freight car or the like, to securely retain the door closed or in a desired position and exhibit an indicator, which is visible from the exterior of the car, for the purpose of apprising the attendant or the like of the condition of the apparatus.

As is well known, practically all freight or box cars are provided with an end-door or doors, in addition to the usual side doors. These end-doors are ordinarily employed, when the car is being loaded with lumber, pipes or other freight which is too long to be passed through the side doors. Great difficulty has heretofore been encountered in connection with these end-doors, for two reasons, to wit, first, these end-doors are not infrequently left unlocked or being locked are readily opened from the exterior of the car, whereby the car may be fraudulently entered and the contents robbed, and second, the location of these end-doors render the locking or sealing of the same particularly dangerous, whereby serious accidents frequently result to the train hands or attendants.

An important object of the invention is to provide a lock, or fastening of the above mentioned character, which is operated from the interior of the car, to hold the door or end-door in a desired or closed position, and which when active or serving to hold the door closed, will exhibit a visible indicator upon the exterior of the car, thus enabling the attendant to ascertain at a glance that the door is properly locked and eliminating the necessity of the attendant climbing upon the car, or going between the ends of two adjacent cars, in locking the door or in ascertaining if the same is properly locked.

A further object of the invention is to provide means of the above mentioned character, which are simple in construction, inexpensive to manufacture, convenient in use, strong and durable.

Other objects and advantages of the invention will be apparent during the course of the following description.

In the accompanying drawings, forming a part of this specification and in which like numerals are employed to designate like parts throughout the same, Figure 1 is a perspective view of a fastening or lock embodying my invention, showing the gravity operated lock-lever in the lower position, Fig. 2 is an edge elevation of the hasp, carrying the indicator-arm or extension, Fig. 3 is a side elevation of the plate or body portion of the apparatus, with the gravity operated lock-lever elevated, and parts omitted, Fig. 4 is a fragmentary side elevation of a box or freight car equipped with my apparatus, showing the indicator-arm extending exteriorly of the car, Fig. 5 is a horizontal sectional view taken on line 5—5 of Fig. 4, Fig. 6 is a side elevation of a modified form of the invention, Fig. 7 is a transverse sectional view taken on line 7—7 of Fig. 6, Fig. 8 is a similar view taken on line 8—8 of Fig. 6, and, Fig. 9 is a side elevation of a guard-plate.

Attention being called first to Figs. 1 to 5 inclusive, the numeral 10 designates the body of a freight or box car, provided in its end and near the top thereof, with an end-door opening 11, adapted to be covered by a preferably horizontally sliding end-door 12. The usual hangers or like means are employed to guide the end-door 12 in its movement. The numeral 13 designates a plate or body portion of the apparatus, which is arranged within a recess or cut out portion upon the inner side of end-door 12, between the end-door and the end of the body portion 10 of the car. This plate 13 is rigidly attached to the end-door by means of screws, bolts or the like, as indicated at 14. The plate 13 is provided near one end, as more clearly shown in Fig. 3, with an opening 15, adapted for registration with a transverse opening 16, formed through the end-door 12, when the door is in the closed position. The numeral 16' designates a hasp or lock-member, having one end apertured, as shown at 17, for pivotal connection with an eye-bolt 18, which is secured to the adjacent wall or jam of the door-opening 11, as shown. Rigidly connected with the opposite or free end of the hasp or lock-member 16 is a combined indicator-element and bolt 19, preferably formed integral therewith. This indicator-element 19 is preferably slightly longitudinally curved, and is adapted to be inserted through the openings 15 and 16, when they are in registration, as above stated. Rigidly secured to the hasp or lock-member 16', adjacent the indicator 19 is a head 20, as shown. Below the hasp or lock-member 16' is a lug or tongue 21, preferably struck or stamped from the plate or body portion 13, the same serving to support the hasp or lock-member 16, as shown. Preferably gravity operated means are provided to lock the hasp or lock-member 16' in the active or closed position, the same comprising a disk 22, eccentrically pivoted to the plate 13, as shown at 23. Rigidly connected with the disk 22, by any suitable means, is a gravity operated lock-lever 24, the upper end of which extends beyond the disk 22, as shown at 25, and is adapted for engagement with a stop or lug 26, preferably struck or stamped from the plate 13, whereby the upward movement of the lock-lever 24 is positively limited. The lower end of the lock-lever 24 is apertured, as shown at 27, for receiving a sealing device 28, also passed through the opening 17 of the hasp 16', as shown. This sealing device may be of any well known or preferred type. In the use of this form of the apparatus, the attendant of the like, enters the car, and moves the end-door 12 to the closed position, whereby the opening 15 is brought into registration with the opening 16. The indicator-element or arm 19 carried by the hasp 16' is now passed through the openings 15 and 16, the same passing to the exterior of the car, whereby the same may be readily observed from such exterior thereof, indicating that the door is properly locked in the closed position. It is thus seen that the element 19 serves as an indicator and as a bolt to lock the door 12 in the closed position. The lock-lever 24 is now swung to the lower position, or released in order that it may swing to the lower position, the same assuming a substantially vertically arranged position upon the inner side of the hasp 16, thus positively preventing the inward movement of the same. In order that the lock may not be fraudulently operated from the interior of the car, the lock-lever 24 is sealed in the vertical position by the sealing device 28, as hereinabove explained.

In the modified form of the invention, as shown in Figs. 6 to 9, inclusive, the numeral 29 designates a plate or body portion which is rigidly mounted upon the wall or jam of the end-door opening 11, by means of screws or bolts 30, as shown. The plate 29 has its central part bent or forced laterally outwardly with respect to the jam, providing a horizontal guide 31, having a longitudinally extending slot 32. This slot has its forward portion 33 disposed in a plane below the body portion thereof, providing an inclined portion 34 in the slot, as shown. Arranged upon the exterior of the guide 31 is a combined indicator and bolt 35, to which is rigidly secured a handle or knob 36, by means of which the same may be readily moved or reciprocated from the interior of the car. Rigidly attached to the opposite face of the element 35 is a headed-stud 37, having its shank operating within the slot 32, and formed square in cross-section, whereby the same prevents the swinging movement of the element 35. The end-door 12 of the car is provided with a transverse opening 38, preferably protected by a guard-plate 39, having an opening 40 in registration with the opening 38. It is obvious that the element 35 may be moved outwardly into and through the openings 38 and 40, the same extending exteriorly of the car-body, thus serving to securely lock the door in the closed position and as a visible indicator, that the door is properly locked. When the element 35 is moved to the outer active position, the same is lowered, as the shank of the headed-stud passes into the lower portion 33 of the slot 32, whereby it is impossible to move the same longitudinally in an opposite direction, without elevating the element 35.

Means are provided to lock the element 35 against vertical movement when the same has been shifted to the outer or active position, whereby it will be securely locked in such position, comprisng a disk 41, eccentrically pivoted to the plate 29, as shown at 42. This disk is provided with a tooth or extension 43, for engaging a stop lug 44, rigidly secured to the plate 29, as shown. Rigidly secured to the disk 41 is a gravity operated lock-lever 45, having its lower end apertured, as shown at 46, for receiving a sealing device 47, engaging a staple 48 or the like, as shown. When the lock-lever 45 is in the vertical position and the element 39 in the outer or active position, the disk 41 will engage the upper longitudinal edge of the element 35, thus positively locking the same against vertical movement, whereby it is impossible to move the same inwardly longitudinally.

The operation of the second form of the invention is as follows:—The attendant or the like, from the interior of the car, moves the end-door 12 to the closed position, whereby the openings 38 and 40 are brought in alinement with the element 35. This having been done, the element 35 is passed through and beyond these openings, the same extending exteriorly of the car body, thus not only serving to lock the door in the closed position, but providing an indicator visible from the exterior of the car, showing that the door is properly locked. The lock-lever 45 is now allowed to gravitate to the vertical position, the same turning the disk 41, which engages the upper longitudinal edge of the element 35 to positively hold it against vertical movement, whereby it is impossible to move the same longitudinally and inwardly. The sealing device 47 is connected with the lever 45, to prevent the same from being fraudulently moved to the upper position for operating the apparatus.

It is to be understood that the forms of my invention herewith shown and described, are to be taken as preferred examples of the same and that various changes in the shape, size, and arrangement of parts may be resorted to without departing from the spirit of the invention or the scope of the subjoined claims.

Having thus described my invention what I claim is:

1. The combination with a car-body and its movable door, of an element operated from the interior of the car-body and adapted to hold the door against movement in the desired position and to extend beyond the exterior of the car-body to indicate from such exterior that the door is locked.

2. The combination with a car-body and its movable end door having an opening formed therethrough, of a movable element arranged within the car-body and having a portion thereof adapted to be passed through the opening in the door and extend to the exterior of the car-body to serve as a lock for the door and as an indicator visible from the exterior of the car-body showing that the door is properly locked, means to connect the element with the interior of the car-body, and means to retain the element in the locked position.

3. Apparatus of the character described, comprising an element to be arranged within a car-body and having a portion thereof adapted to engage with the door of the car-body to extend to the exterior thereof and serve as a combined lock member and indicator, means to connect the element with the car-body, and means to hold the element in the active position.

4. Apparatus of the character described, comprising a movable element arranged within a car-body and operated from the interior thereof and adapted to engage with the door of the car-body to hold the same against movement and to extend exteriorly thereof for a substantial distance to serve as an indicator, means for connecting the element with the car-body, and gravity operated means to hold the element in the active position.

5. Apparatus of the character described, comprising a plate accessible from the interior of the car-body, a movable element operated from the interior of the car-body and adapted to engage the door of the car-body to hold the same against movement and extend exteriorly of the door for a substantial distance to serve as an indicator, gravity operated means pivotally connected with the plate and adapted to engage with the element to retain the same in the active position, and a sealing device connected with the gravity operated means to prevent fraudulent operation thereof.

6. Apparatus of the character described, comprising a plate adapted to be arranged upon the inner side of the door of a car-body, a hasp pivotally connected with the car-body and provided with a lateral extension engaging the door and extending exteriorly thereof for a substantial distance, and a movable lock-element connected with the plate to engage the hasp for retaining the same in the active position.

7. Apparatus for locking a movable door in the desired position and to indicate from the exterior side of the door that the same is locked, comprising a member permanently connected with a fixed support disposed upon the inner side of the door and adapted to be passed through a transverse opening in the door to project beyond the exterior surface of the door for a substantial distance, to serve as a visual indicator, and means operated from the interior of the door to hold the member in the active position.

In testimony whereof I affix my signature in presence of two witnesses.

NOAH P. KEMP.

Witnesses:
M. A. HARTIGAN, Jr.,
L. M. NEWBERY.

Copies of this patent may be obtained for five cents each, by addressing the "Commissioner of Patents, Washington, D. C."